Sept. 5, 1967     J. T. BANKOWSKI     3,339,462
WEIGHING DEVICE
Filed June 21, 1965     3 Sheets-Sheet 1
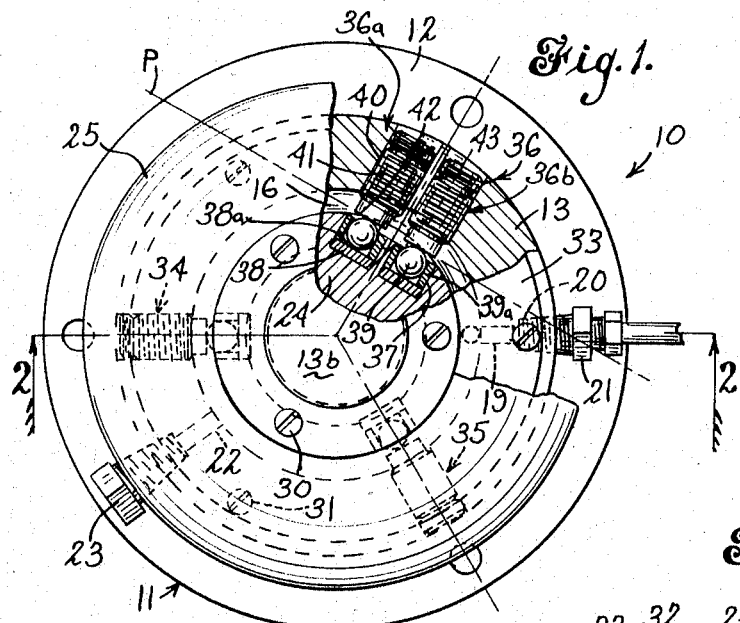
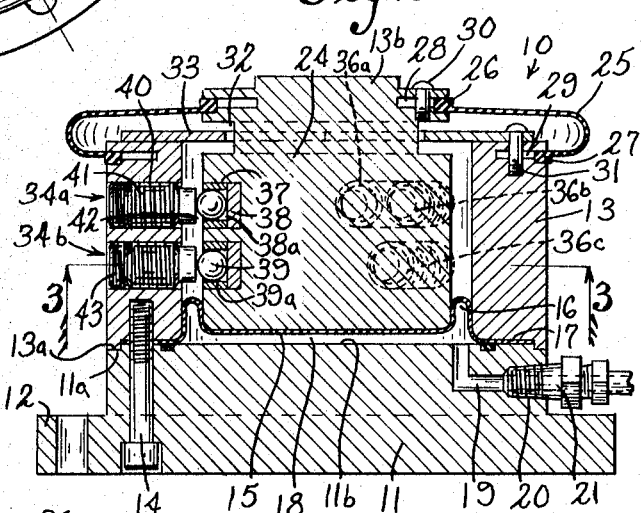
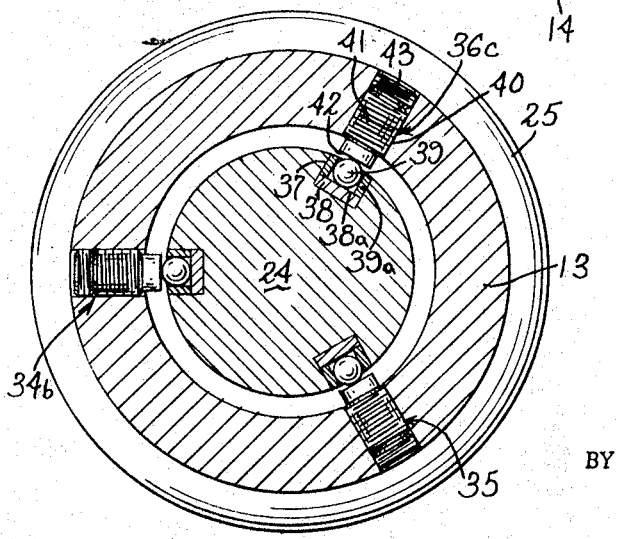
INVENTOR
Joseph T. Bankowski
BY De Lio and Montgomery
ATTORNEYS

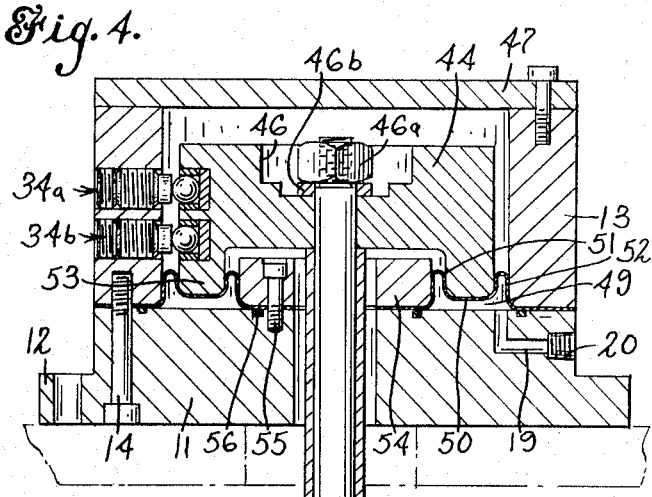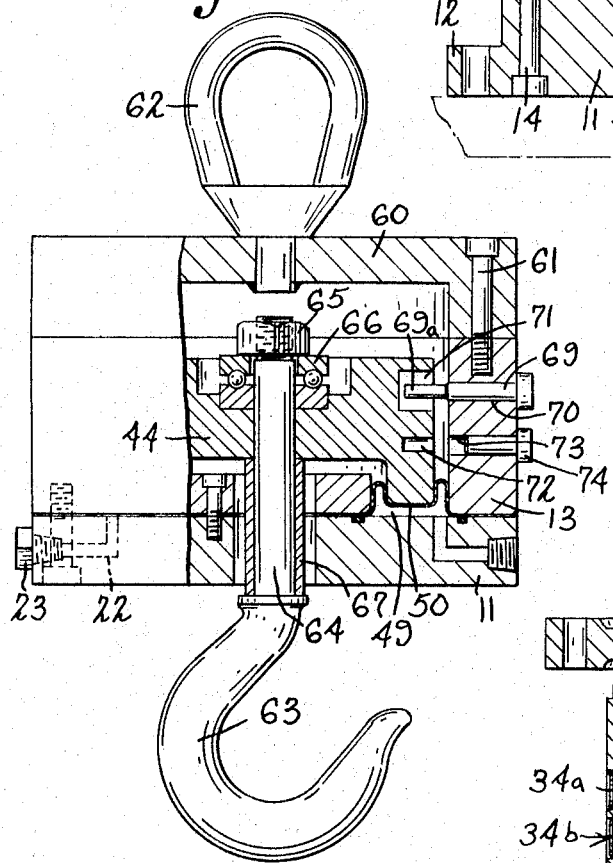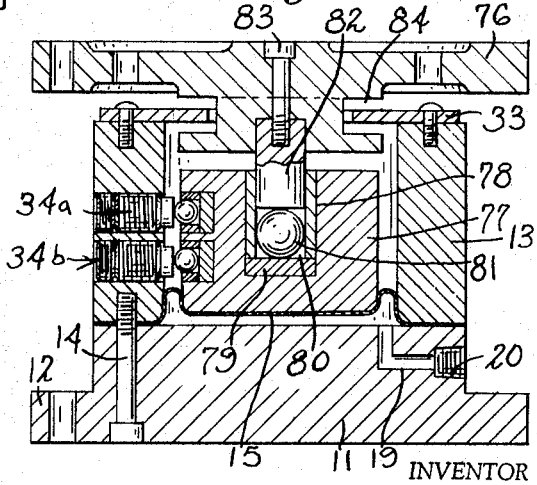

Sept. 5, 1967                    J. T. BANKOWSKI                    3,339,462
                                  WEIGHING DEVICE
Filed June 21, 1965                                                3 Sheets-Sheet 3
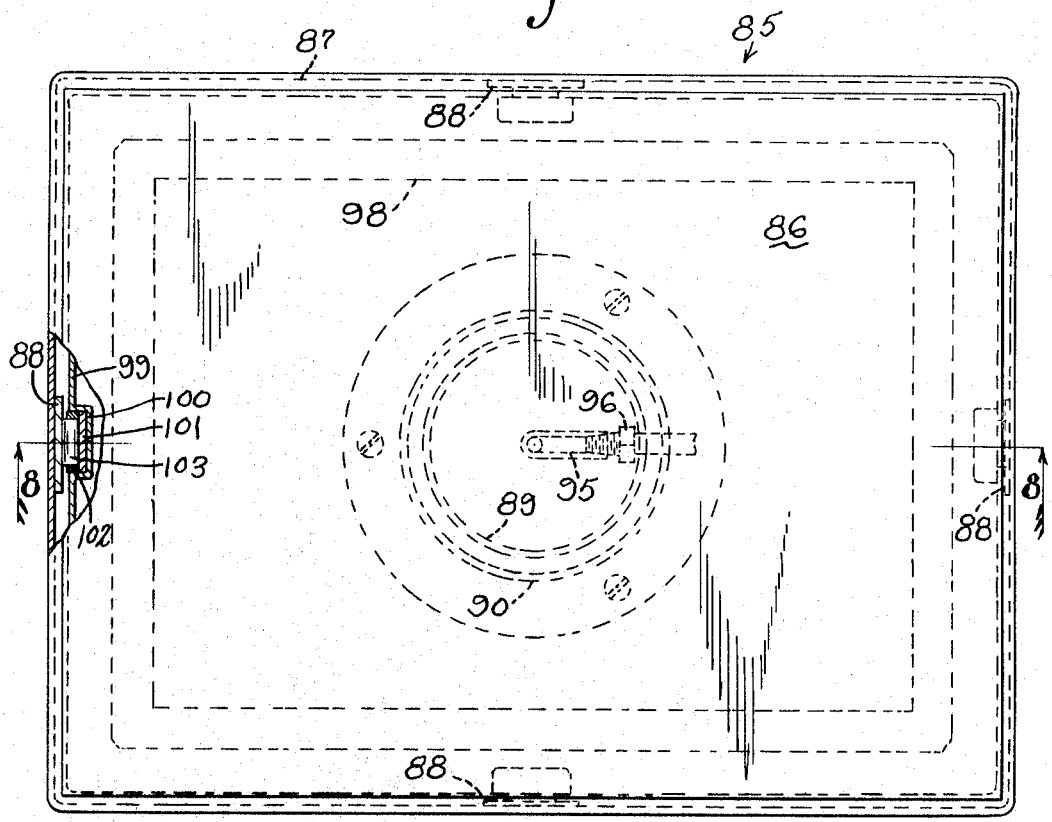
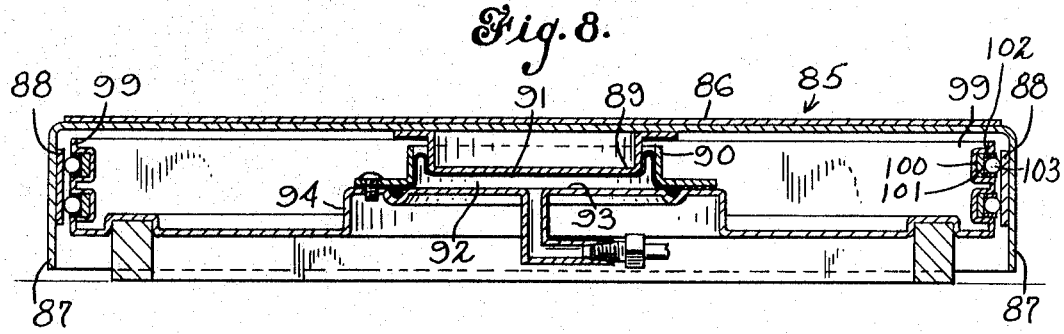
INVENTOR
Joseph T. Bankowski
BY De Lio and Montgomery
ATTORNEYS //
United States Patent Office 3,339,462
Patented Sept. 5, 1967

3,339,462
WEIGHING DEVICE
Joseph T. Bankowski, 144 Jefferson St.,
Stamford, Conn. 06902
Filed June 21, 1965, Ser. No. 465,428
6 Claims. (Cl. 92—23)

This invention relates to weighing devices and more particularly relates to hydraulic load or pressure cells.

A load or pressure cell of the hydraulic type generally comprises a piston-like member together with a cylinder or guide therefor and defining therebetween a flexible cavity containing a hydraulic fluid. In operation, a load is applied to the piston member and fluid in the cavity has pressure applied thereto. The fluid transmits the applied pressure to a pressure indicating device which is suitably calibrated to indicate the load applied to the piston member.

This invention is concerned with such load or pressure cell and is designed to overcome, or substantially eliminate, many of the difficulties and inherent inaccuracies found in the known devices. This present invention provides a hydraulic pressure cell wherein the piston-like load-receiving member is coaxially received with a cylinder member and new and improved means are provided therebetween to insure that there is only longitudinal motion of the piston with respect to the cylinder. Additionally, such means prevent any rotative movement of the piston within the cylinder and in so doing prevent the transmission of any torque to a cavity-defining flexible diaphragm. The arrangement has such effectiveness in providing a stable piston that a device embodying the invention can be tilted and receive a load other than along a vertical axis and still yield a precise, accurate indication of such load. The piston and cylinder structure is further arranged such that there is no direct contact therebetween, yet means are provided to accurately center the piston within the cylinder.

The arrangement is such that the hydraulic fluid is introduced only into a stationary or base side of the assembly and thus the hydraulic lines connected thereto require no flexibility, further contributing to the accuracy of the cell.

Accordingly, an object of this invention is to provide a new and improved weighing device of the type described.

Another object of this invention is to provide a device of the type described wherein there is only point and rolling contact between the piston and cylinder therefor.

Another object of this invention is to provide a device of the type described having new and improved means for preventing rotary movement of the piston in the cylinder and, also, for holding the piston vertically stable.

Another object of this invention is to provide a new and improved means and method for initially adjusting the position of the piston when initially placed in operation.

A further object of this invention is to provide a device of the type described having new and improved means for centering the piston with respect to its cylinder.

The features of the invention which are believed to be novel are set forth with particularity and definitely claimed in the concluding portion of this specification. However, the invention both as to its organization and operation, together with further objects and advantages thereof, may best be appreciated by reference to the following detailed description taken in conjunction with the drawings, in which:

FIG. 1 is a plan view of a load cell embodying the invention with a portion thereof broken away;

FIG. 2 is a view seen in the plane of line 2—2 of FIG. 1;

FIG. 3 is a sectional view seen in the plane of line 3—3 of FIG. 2;

FIG. 4 is a sectional view of another embodiment of the invention adapted to receive a depending load;

FIG. 5 is an elevation partially in half section which illustrates another load cell embodying the invention, which is arranged to lift an object to be weighed;

FIG. 6 is a sectional view of another embodiment of the invention which includes a load receiving adaptor;

FIG. 7 is a plan view, with a portion thereof in section, which illustrates an embodiment of the invention in a rectangular configuration; and FIG. 8 is an elevation in section seen in a plane along line 8—8 of FIG. 7.

Referring now to the drawings and, more specifically, FIGS. 1–3 thereof, a load cell 10 embodying the invention comprises a base member 11 which may have a mounting flange 12. A cylindrical body member 13 is secured to base member 11 by means of a plurality of threaded bolts 14. Body member 13 is provided with an annular depending flange 13a which is received in annular shoulder 11a on base member 11 to coaxially center body member 13 with respect to base 11. A diaphragm 15 having a central circular portion surrounded by an upstanding ridge or convolute 16 has an annular flange portion 17 received between an upper planar surface 11b of base 11 and cylinder member 13. The diaphragm 15 is of a resilient material and further defines with the upper planar surface 11b of base 11 a fluid pressure cavity 18. A passage 19 is drilled, or otherwise defined, in base 11 to provide communication between cavity 18 and an exterior surface of base 11. As illustrated, base 11 is countersunk and threaded as at 20 to receive a matingly threaded fitting or nipple 21. Fitting 21 is adapted to provide communication of fluid in cavity 18 to a suitable pressure indicating device (not shown). A second port 22 (shown in FIG. 1 only) normally closed by a threaded closure member 23, is defined in base 11 to permit initial charging of cavity 18 with hydraulic fluid and bleeding of air therefrom.

A piston member 24 having a cylindrical outer surface coaxial with the cylindrical inner surface of body member 13 is received within the inner cylindrical surface of member 13 on the central portion of diaphragm 15. An annular dust cover or boot 25 of flexible material may be secured between the exterior wall of body member 13 and an upper portion of piston member 24 to seal the cylinder cavity. Dust cover 25 has thickened edges 26 and 27 received in circular slots 28 and 29 and clamped therein by each of a plurality of bolts 30 and 31, respectively. Piston 24 has an undercut or recess 32 of predetermined depth and receives therein a limit stop in the form of a disc 33 carried by member 13. It will be apparent that the upper portion 13b of poiston 24 may be detachably mounted to piston 24 or disc 33 may be formed in two parts.

In accordance with an aspect of the invention piston member 24 is centered in the cylinder by means of three substantially equilaterally, circumferentially spaced bearing assemblies generally indicated by the reference numerals 34, 35 and 36, FIG. 1. Each bearing assembly comprises at least two subassemblies. Bearing assembly 34 comprises upper and lower vertically spaced sub-assemblies 34a and 34b. As illustrated in FIG. 2, radially directed cylindrical sockets 37 are defined in piston member 13 for each of sub-assemblies 34a and 34b. Each of the sockets 37 receives at the base thereof a hardened steel bearing plate 38 having a bearing surface 38a adapted to contact ball 39. Ball 39 is received within a centering bushing or cylinder 39a which is preferably of elastomeric material. Radially aligned with sockets 37 in cylinder member 13, when piston member 24 is in a neutral position, are threaded openings 40 which receive therein a threaded member 41 having a hardened end surface 42 arranged to contact ball 39. Both balls 39 and surfaces 42 extend into the annular space between the piston and the cylinder wall. Threadably received in openings 40 behind member 31 are lock screws 43. The two bearing subassemblies forming bearing assembly 35 are similarly constructed and spaced along a center line 120 degrees from the center line of bearing assemblies 34a and 34b.

For reasons hereinafter described bearing assembly 36 comprises three sub-assemblies 36a, 36b and 36c. The center line of bearing assembly 36 resides in a vertical plane spaced substantially 120 degrees from the radial center lines of bearing assemblies 34 and 35. Bearing sub-assemblies 36a and 36b are equally spaced on opposite sides of this radial center line and the bearing surfaces 42 thereof reside in a common plane P as more clearly shown in FIG. 1. Bearing sub-assembly 36c is preferably centered on a center line which resides in the same plane as the center line of bearing sub-assemblies 34b and 35b.

The reaction of the steel balls 39 of bearing sub-assemblies 36a and 36b against associated surfaces 42 and 38a prevents any turning or rotary motion of the piston within the cylinder. Additionally, the vertically displaced sub-assemblies of each bearing assembly prevents any tilting or cocking of the piston in the cylinder and ensures only linear motion of piston member 13 along the longitudinal axis of the cylinder. The three-point construction in two vertically displaced horizontal planes further allows the device 10 to be utilized in a tilted or angled position if necessary.

When the piston is initially assembled in the cylinder it may be accurately placed and centered therein by means of the positioning screw threads of each member 41, which members have the usual tool-receiving slot (not shown) in the end thereof. Then when the piston member 13 is centered and positioned on the central upper surface of diaphragm 15 it has only one degree of motion with respect to the cylinder, that is, reciprocating motion along the axis of the unit.

Additionally, it may be noted that the lead-in to the fluid cavity 18 is through stationary base member 11 and, therefore, there is no movement of the line connected to fitting 20 upon movement of piston 24. Furthermore, it may be seen that the disclosed construction eliminates the need for any spring elements or restoring purposes inasmuch as the piston in its normal or neutral position rests on the diaphragm 15 which defines the cavity 18 when charged with hydraulic fluid. Means are also provided for centering the piston in a neutral position to charge cavity 18, as will hereinafter be described.

With the bearing and guide construction disclosed, cross loads on the piston have minimal, if any, effect upon the accuracy of the load cell, and an angular motion of the piston is prevented thereby essentially eliminating any errors that might be introduced due to a torsional effect on diaphragm 15 or cover 25. Additionally, it may be noted that piston 24 is located within cylinder member 13 and the sides of the piston are not exposed to any external means of producing a force thereon.

FIG. 4 illustrates an embodiment of the invention arranged for tension loads. In FIG. 4 like elements therein corresponding to FIGS. 1–3 bear like reference numerals. A piston 44 having a cylindrical surface is again disposed within cylinder member 13 and limited to vertical reciprocating movement only by means of bearing assemblies as previously described. Load may be applied to piston 44 by means of an eyebolt-like member 45 which extends through both a central passage in base member 11 and a central passage in piston 44. Bolt 45 is secured in a recess 46 in the top of piston 44 by means of a nut 46a resting on a washer 46b. A cover member 47 closes the upper opening in cylinder member 13. A sleeve 48 disposed about the shank of bolt 45 together with nut 46a prevents relative motion between bolt 45 and piston 44. An annular fluid chamber 49 is defined by a diaphragm 50 having inner and outer ridges or convolutes 51 and 52, respectively. A depending annulus 53 of piston 44 is received in the valley between convolutes 51 and 52. An annular spacing and sealing member 54 is secured to the upper planar surface of base member 11 as by means of bolts 55 to define the inner boundary of diaphragm 50 and further aid in sealing chamber 49. Member 54 further acts as a limit to downward movement of piston 44 before the piston can bottom on the upper surface of base 11. An O-ring type seal 56 is received in a groove defined therefor in the upper surface of base 11.

This embodiment of the invention may be utilized where base 11 is adapted for stationary installation and the mass to be weighed is secured to the eyelet portion of bolt member 31. As illustrated, base 11 may be secured to a supporting member having an opening therethrough which receives the shaft portion of member 45. This construction, for measuring tension loads, through use of the double convolute diaphragm enables the load to be applied directly to the center of the piston.

Another embodiment of the invention arranged for cable tension application is shown in FIG. 5. It is generally similar in construction to the load cell of FIG. 4 and similar elements bear similar reference numerals. In the construction of FIG. 5 the member 13 further has a cap member 60 secured thereto as by means of bolts 61. Cap member 60 has secured thereto a lifting eye 62. A lifting hook 63 with integral shaft 64 is supported by piston 44 and receives thereon a securing nut 65 which rests on a bearing assembly 66. Bearing assembly 66 permits rotation of shaft 64 with respect to piston 44. A sleeve 67 is disposed about a portion of shaft 64 and prevents upward movement of the hook and shaft with respect to piston 44. Piston 44 is supported on the diaphragm 50 and accurately spaced as previously described in conjunction with FIGS. 1–4.

A further feature of the invention is illustrated in FIG. 5 and provides a means for centrally locating a piston at the mean position of its stroke when the cell is initially charged, and a means for predetermining the quantity of hydraulic fluid in the cell and prevent bottoming of the piston under load. A gaging pin 69 is normally carried in passage 70 provided therefor in member 13 and extends into a large bore 71 defined in piston 44 with clearance therethrough to permit the predetermined travel of piston 44. A gaging bore 72 is defined in piston 44 of a size selected to receive the end portion 69a of gaging pin 69 with a very close fit. Bore 72 is arranged to be aligned with aperture 73 in member 13. When the cell is to be charged, cover pin 74 is removed from aperture 73 and gaging pin 69 is inserted therein with the gaging tip 69a thereof received in bore 72. Piston 44 is now located at the mean position of its stroke and hydraulic fluid may be introduced into cavity 49 through passage 19 as heretofore described. Initially, hydraulic fluid is allowed to exit from the cavity 49 through passage 19 to bleed all air from the cavity. When the cavity has been charged pin 69 is replaced in passage 70 in the position shown in FIG. 5 and cover pin 74 is reinserted in aperture 73. The conduit 19 is then connected through fitting or nipple 21 (shown in FIGS. 1 and 2 only) to a suitable indicating device. The piston is now positioned at the mean position of its stroke and supported on diaphragm 50. Now, when a load is applied to the piston, the pressure created thereby in the hydraulic fluid is transmitted by the hydraulic fluid to the indicating device.

Another embodiment of the invention is shown in FIG. 6 and is of similar construction to that shown in FIGS. 1–3 but further includes a load receiving platform 76 and means hereinafter described for insuring that the load applied to platform 76 is centrally transferred to piston 77. It will be apparent that the basic construction of FIG. 6 is similar to that shown in FIG. 2 with the exception of the structure of piston 77 and load receiving platform 76. Piston 77 is provided with a centrally depending cylindrical passage 78 which receives a disc-like member 79 therein providing a hardened surface 80 upon which rests a steel ball 81. A plunger member 82 depends from platform 76 and is secured thereto as by means of a bolt 83. Plunger 82 bears on ball 81 and because of the spherical shape of ball 81 makes essentially point contact therewith. Therefore, the load applied to platform 76 is, in turn, applied to ball 81 on the center line of the piston. Ball 81 further bears on contact plate 79 and also makes essentially point contact thereon along the vertical center line of piston 77. With this arrangement, a load applied to platform 76 is, in turn, applied to piston 77 centrally thereof and in a vertical direction. Platform 76 may be formed in two parts to accept disc 33 in a recess 84 or disc 33 may be formed in two parts as heretofore explained.

It is to be understood that the various features shown in several embodiments may be incorporated in all embodiments. For example, all embodiments preferably include passage 22 as well as passage 19, and all embodiments preferably include the gaging pin disclosed in FIG. 5. To avoid redundancy of illustration all features of the invention have not been shown in all embodiments.

Still another embodiment of the invention is shown in FIGS. 7 and 8. A load cell 85 is of rectangular configuration and comprises a load-receiving platform 86 having depending flanges 87 about its perimeter, each of which carry a bearing plate 88. The load-receiving platform is further formed with a cylindrical piston 89 formed integral therewith or carried thereby which is received in cylinder 90 on a diaphragm 91. A fluid-pressure cavity 92 is defined by diaphragm 91 and the surface 93 of an upwardly projecting cylinder carrying member 94 which mounts cylinder 90. A conduit 95 provides communication to the defined cavity and carries a nipple 96 for connection to an indicating device. The upwardly projecting member 94 extends into a lower portion 97 which is carried on a base 98. The cylinder carrying member 94 has upstanding flanges 99 having pockets 100 defined therein which each receive a bearing plate 101, an elastomeric sleeve 102 and a roller 103. This is the same bearing construction previously described in conjunction with the other embodiments of the invention.

With this construction four points of the piston carrying member are in rolling contact with four points of the stationary member on four sides thereof. This arrangement prevents any tendency of the load-receiving platform to cock with respect to the stationary member and provides ease of movement of the piston in the cylinder, there being no frictional contact therebetween except at the balls 81 and bearing plate 88.

This arrangement embodying the features of the invention has very good vertical stability. Again, it will be noted that the pressure line (not shown) communicating with conduit 95 is on the dead side of the apparatus which increases the resulting weighing accuracy.

It may thus be seen that the objects of the invention set forth above, as well as those made apparent from the preceding description are efficiently attained. While several preferred embodiments of the invention have been disclosed and illustrated, other embodiments of the invention as well as modifications to the disclosed embodiments which do not depart from the spirit and scope of the invention may occur to those skilled in the art. Accordingly, the appended claims are intended to cover all embodiments of the invention and modifications thereof which do not depart from the spirt and scope of the invention.

What is claimed is:

1. A fluid pressure load cell comprising a cylinder assembly defining a cylinder having an upper surface and an internal cylinder wall, a piston assembly including a piston receiving within said cylinder, said piston having a substantially continuous cylindrical sidewall defining an annular space with said internal cylinder wall, a flexible diaphragm interposed between said surface and said piston and defining with said surface a fluid pressure cavity, a fluid conduit defined in said cylinder assembly and providing communication with said cavity from without said cylinder assembly, a plurality of bearing assemblies cooperatively carried by said cylinder and said piston members and centering said piston with respect to said cylinder, each of said assemblies comprising a rotative bearing element carried within an individual socket in one of said piston and cylinder members and a planar bearing surface providing element carried by the other of said members, said bearings and said planar surfaces being in contact, said bearing surfaces residing within said annular space.

2. The load cell of claim 1 wherein said planar surface providing means are adjustable radially with respect to the axis of said piston and cylinder to center said piston member in said cylinder.

3. The cell of claim 1 wherein two of said assemblies are so disposed as to provide two of said bearing surfaces in chordal relation with respect to the axis of said cell with the points of contact being chordally spaced apart.

4. A fluid pressure load cell comprising a base member having an upper surface, a cylindrical member carried by said base member and extending perpendicularly from sad surface, said cylindrical member defining an internal cylinder, a piston member received within said cylinder said piston member having outside cylindrical surface of lesser diameter than said cylinder and defining an annular space therebetween, a flexible diaphragm interposed between said upper surface and said piston defining with said upper surface a fluid pressure cavity, a fluid conduit defined in said base member and providing communication with said cavity from without said base, a plurality of rotative bearing assemblies cooperatively carried by said cylinder and said piston members and disposed within said annular space for centering said piston with respect to said cylinder, said cylindrical member defining a passage radially through the wall thereof, said piston defining a radially directed gaging bore, a gaging pin of the same dimension as said gaging bore adapted to be inserted through said passage into said bore to render said piston non-movable with respect to said cylinder member and to predetermine a position of said piston member with respect to said cylinder member.

5. A fluid pressure load cell comprising a base member having an upper planar surface, a cylinder member carried by said base member and extending perpendicularly from said planar surface, said cylindrical member defining an internal cylinder, a flexible diaphragm having two concentric convolutes defining with said planar surface an annular fluid pressure cavity, a fluid conduit defined in said base member and providing communication with said cavity from without said base member, a piston member received within said cylinder on said diaphragm, said piston member having an outside cylindrical surface of lesser diameter than said cylinder and defining an annular space therebetween, said piston having a depending annulus received between said convolutes, bearing means carried by one of said cylinder members and said piston member and extending into said annular space and centering said piston in said cylinder and permitting only longitudinal movement of said piston along the axis of said cylinder, an opening centrally defined in said base member, a load engaging means carried by said piston and extending through said opening in said base member.

6. The load cell of claim 5 further including means mounting said load engaging means on said piston for rotative movement about the center line of said piston.

References Cited

UNITED STATES PATENTS

| | | | |
|---|---|---|---|
| 1,214,745 | 2/1917 | Beard et al. | 177—208 |
| 1,342,140 | 6/1920 | Whitton | 92—13 X |
| 1,798,076 | 3/1931 | Frisch | 177—208 |
| 1,878,835 | 9/1932 | Fleischmann et al. | 177—208 X |
| 2,108,433 | 2/1938 | Edwards | 177—208 X |
| 2,592,501 | 4/1952 | Williams | 92—5 |
| 2,688,232 | 9/1954 | Geyer | 92—17 |
| 2,692,618 | 10/1954 | Ludowici | 92—101 |
| 2,934,092 | 4/1960 | Saunders | 92—101 |
| 2,952,145 | 9/1960 | Thompson | 308—6 |
| 2,960,113 | 11/1960 | Bradley | 92—101 |
| 2,960,328 | 11/1960 | Tate | 92—101 X |

MARTIN P. SCHWADRON, *Primary Examiner.*

I. C. COHEN, *Assistant Examiner.*